United States Patent [19]
Okude et al.

[11] Patent Number: 5,397,603
[45] Date of Patent: Mar. 14, 1995

[54] RESIN COMPOSITION AND COATING COMPOSITION CONTAINING THE SAME

[75] Inventors: Yoshitaka Okude; Tsuneyoshi Hisai, both of Hirakata; Akira Fushimi, Ikoma; Kazuhiko Takeoka, Kawanishi; Seigo Miyazoe, Takatsuki, all of Japan

[73] Assignee: Nippon Paint Co., Ltd., Osaka, Japan

[21] Appl. No.: 281,074

[22] Filed: Jul. 27, 1994

Related U.S. Application Data

[60] Division of Ser. No. 114,303, Sep. 2, 1993, which is a continuation-in-part of Ser. No. 65,910, May 25, 1993, abandoned.

[30] Foreign Application Priority Data

May 27, 1992 [JP] Japan ................................. 4-134826

[51] Int. Cl.⁶ ........................... B05D 1/36; B05D 7/00
[52] U.S. Cl. ................................ 427/407.1; 427/410; 427/412.1
[58] Field of Search ................. 427/407.1, 410, 412.1; 525/194, 195, 199

[56] References Cited

U.S. PATENT DOCUMENTS

| | | | |
|---|---|---|---|
| 5,166,265 | 11/1992 | Nakahata et al. | 525/200 |
| 5,229,461 | 7/1993 | Saitoh | 525/200 |
| 5,270,392 | 12/1993 | Okude et al. | 525/207 |

FOREIGN PATENT DOCUMENTS 2045577 2/1990 Japan.
3287650 12/1991 Japan.

*Primary Examiner*—Michael Lusignan
*Attorney, Agent, or Firm*—Townsend & Banta

[57] ABSTRACT

The present invention provides a thermosetting resin composition which provides cured film having not only excellent acid resistance but also good weather resistance, good mar resistance and high water repellency. The thermosetting resin composition comprises (a) a fluorinated polymer having a hydroxyl group and/or an acid group, (b) a polymer having a carboxyl group and a carboxylic ester, and (c) a polymer having a hydroxyl group and an epoxy group.

3 Claims, No Drawings

RESIN COMPOSITION AND COATING COMPOSITION CONTAINING THE SAME

CROSS REFERENCE TO A RELATED APPLICATION

This is a divisional application of application Ser. No. 08/114,303, filed Sep. 2, 1993, which is a Continuation-In-Part application of Ser. No. 08/065,910, filed May 25, 1993, now abandoned.

FIELD OF THE INVENTION

The present invention relates to a thermosetting resin composition which is suitable for top-coating paint and coilcoating paint.

BACKGROUND OF THE INVENTION

Top coating paint for automobiles generally contains, as a film-forming binder, a combination of a hydroxyl group-containing polymer and a melamine curing agent. The cured film obtained from the melamine curing system, however, has poor acid resistance and is damaged by acid rain which has recently become one of serious problems. The damage of the film provides poor appearance.

In order to overcome the above mentioned defects, the present inventors have proposed novel coating compositions without the melamine curing agent in Japanese Kokai Publications 45577/1990 and 287650/1991. The proposed coating composition cures by means of the reaction of acid and epoxy and therefore has good acid resistance. In this curing system, however, if degree of crosslinking is set high enough to impart good weather resistance to the cured film, the resulting film has poor elongation and is stiff and brittle. The stiff and brittle film has poor mar resistance and is easily damaged by scratch. It is therefore difficult for the proposed coating compositions to employ as top-coating paint. It is desired to develop top-coating paint which has not only excellent acid resistance but also high mar resistance, water repellency and good stain resistance.

SUMMARY OF THE INVENTION

The present invention provides a thermosetting resin composition which provides cured film having not only excellent acid resistance but also good weather resistance, good mar resistance and high water repellency. The present invention thus provides a thermosetting resin composition comprising:

(a) 0.5 to 40% by weight of a fluorinated polymer having a hydroxyl group and/or an acid group, represented by

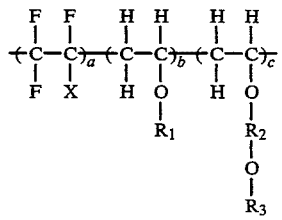

wherein said $R_1$ represents a linear or branched alkyl group or an alkyloyl group, having 2 to 10 carbon atoms, $R_2$ represents an alkylene group having 2 to 10 carbon atoms, $R_3$ represents a hydrogen atom or —CO—$R_6$—COOH in which $R_6$ represents a residue of a dibasic acid anhydride, X is a hydrogen atom, a chlorine atom or a fluorine atom, a, b and c are integers satisfying $a<b+c$, (b) 10 to 60% by weight of a polymer having a carboxyl group and a carboxylic ester, prepared by copolymerizing 15 to 40% by weight of an ethylenically unsaturated monomer having an acid anhydride group, and 60 to 85% by weight of another ethylenically unsaturated copolymerizable monomer to obtain a polymer having acid anhydride groups which are then reacted with a hydroxyl compound having 1 to 12 carbon atoms in a molar ratio of acid anhydride group to hydroxyl group of from about 1/1 to 1/1.5; the % by weight of monomers being based on total monomer weight, and (c) 30 to 60% by weight of a polymer having a hydroxyl group and an epoxy group, prepared by copolymerizing (i) 5 to 40% by weight of a hydroxyalkyl (meth)acrylate represented by:

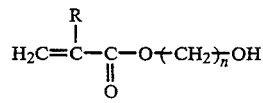

wherein R represents a hydrogen atom or a methyl group and n is an integer of 2 to 8, (ii) 10 to 60% by weight of an epoxy group-containing ethylenically unsaturated monomer, and (iii) 0 to 85% by weight of another copolymerizable ethylenically unsaturated monomer; the % by weight being based on total monomer weight.

According to the present invention, a combination of the fluorinated polymer having a hydroxyl group and/or an acid group with the acid-epoxy curing system provides a coating which has excellent acid resistance, excellent mar resistance and excellent stain resistance.

DETAILED DESCRIPTION OF THE INVENTION

The fluorinated polymer (a) is a copolymer of fluorinated ethylenically unsaturated monomers and other copolymerizable ethylenically unsaturated monomers.

The fluorinated ethylenically unsaturated monomers are generally represented by a chemical formula (i.e. $CF_2$=CFX wherein X is the same as mentioned above), including trifluoroethylene tetrafluoroethylene and chlorotrifluoroethylene.

The ethylenically unsaturated monomers which are copolymerized with the fluorinated ethylenically unsaturated monomer can be both ether or ester-containing monomers $CH_2$=CHO$R_1$ wherein $R_1$ is the same as mentioned above, and hydroxyl and/or acid-containing monomers, $CH_2$=CH—O—$R_2$—O—$R_3$ wherein $R_2$ and $R_3$ are the same as mentioned above. In the formulae, $R_1$ represents an alkyl or alkyloyl group having 2 to 10 carbon atoms, preferably 2 to 8 carbon atoms. $R_2$ represents a linear or branched alkylene group having 2 to 10 carbon atoms, preferably 2 to 8 carbon atoms. $R_3$ represents a hydrogen atom or —CO—$R_6$—COOH in which $R_6$ is an residue of a dibasic acid anhydride, including an alkenylene, alkylene and cycloalkylene group having 2 to 8 carbon atoms.

Typical examples of the ether-containing monomers are cyclohexyl vinyl ether, ethyl vinyl ether, butyl vinyl ether and the like. Typical examples of the ester-containing monomers are vinyl acetate, vinyl propionate, vinyl pivalate, vinyl caproate, vinyl versatate and the like. Typical examples of the hydroxyl-containing monomers are hydroxyethyl vinyl ether, hydroxypropyl vinyl ether, hydroxybutyl vinyl ether and the like. The acid functionality can be introduced by reacting the hydroxyl group in the above monomer with a dibasic acid anhydride. Examples of the dibasic acid anhydrides are maleic anhydride, succinic anhydride, hexahydrophthalic anhydride, 4-methylhexahydrophthalic anhydride, phthalic anhydride and the like.

The fluorinated polymer (a) of the present invention may be prepared by copolymerizing the above mentioned monomers, for example 15 to 60% by weight of the fluorinated monomers, 0 to 30% by weight ether or ester-containing monomers and the balance of hydroxyl or acid-containing monomers, % by weight being based on total monomer weight. The acid functionality may be introduced either before copolymerizing or after forming a copolymer.

The copolymerization may be conducted in a solution, preferably at 40° to 150° C. under elevated pressure in the presence of a polymerization initiator (e.g. azo initiator or peroxides). The process for copolymerization is known to the art, for example explained in detail in Japanese Kokai Publications 34207/1982, 286733/1990 and 302411/1990.

The fluorinated polymer (a) preferably has a number average molecular weight of 500 to 10,000, more preferably 2,000 to 7,000. Number average molecular weights of less than 500 deteriorate crosslinkability due to less functionality in one polymer molecule, and those of more than 10,000 deteriorate compatibility with the other resins. The molecular weight is determined by Gel Permeation Chromatography (GPC).

The fluorinated polymer (a) preferably has a hydroxyl value of 20 to 150 mg KOH/g, more preferably 60 to 120 mg KOH/g, and an acid value of 60 to 180 mg KOH/g, more preferably 60 to 140 mg KOH/g. Hydroxyl values of more than 150 mg KOH/g deteriorate compatibility and those of less than 20 mg KOH/g result in poor water resistance. Acid values of less than 60 mg KOH/g deteriorate crosslinkability and those of less than 180 mg KOH/g result in poor water resistance due to the presence of unreacted acid groups.

The fluorinated polymer (a) may be produced as mentioned above, but may be commercially available under the tradename of Lumi-Flon from Asahi Glass Co., Ltd.

The polymer (b) used in the present invention has both a carboxyl group and a carboxylic ester, and is prepared by copolymerizing 15 to 40% by weight, preferably 15 to 30% by weight, of ethylenically unsaturated monomers having an acid anhydride group and 60 to 85% by weight of other copolymerizable ethylenically unsaturated monomer to obtain a polymer having acid anhydride groups which are then reacted with a hydroxyl compound having 1 to 12 carbon atoms. Examples of the ethylenically unsaturated acid anhydrides are itaconic anhydride, maleic anhydride, citraconic anhydride and the like. The other copolymerizable unsaturated monomers are those which do not adversely affect acid anhydride group, including styrenes, such as styrene and α-methylstyrene; (meth)acrylates, such as methyl (meth)acrylate, ethyl (meth)acrylate, propyl (meth)acrylate, n-, i- or t-butyl (meth)acrylate, 2-ethylhexyl (meth)acrylate and lauryl (meth)acrylate; VeoVa-9® or VeoVa-10® available from Shell Chemical Co.; and the like. The monomers can be used in combination, in order to enhance compatibility with other resins. It is preferred that the other ethylenically unsaturated monomers are a combination of styrene and the other monomers. The styrene may be used in an amount of 5 to 40% by weight based on the total monomer weight.

The copolymerization may be conducted in a solution, for example at a temperature of 100° to 150° C. for 3 to 8 hours in the presence of a radical initiator (e.g. peroxides). The polymer (b) preferably has a number average molecular weight of 500 to 20,000, more preferably 1,500 to 10,000. Number average molecular weights of more than 20,000 elevate polymer viscosity and make it difficult to obtain a coating composition having a high solid content. Those of less than 500 reduce crosslinkability. The polymer thus obtained has an average of at least two acid anhydride groups in one molecule, preferably an average of 2 to 15 acid anhydride groups in one molecule. If the acid anhydride groups average less than 2, the resulting resin composition has poor curability.

The polymer having acid anhydride groups is then reacted with a hydroxyl compound in a molar ratio of acid anhydride group to hydroxyl group of 1/1 to 1/1.5 to produce a polymer (b) having both hydroxyl group and carboxylic ester group. The hydroxyl compound employed in the present invention is low molecular weight and generally has 1 to 12 carbon atoms, preferably 1 to 8 carbon atoms. The half-esterified acid anhydride group will be ring-closed upon curing the composition, but the low molecular weight hydroxyl compound ensures high reproducibility of the ring-closed acid anhydride groups. Typical examples of the hydroxyl compounds are methanol, ethanol, n-propanol, i-propanol, n-butanol, i-butanol, t-butanol, ethyleneglycol monomethyl ether, ethyleneglycol monoethyl ether, dimethylaminoethanol, diethylaminoethanol, acethol, allyl alcohol, propargyl alcohol and the like. Preferred are acethol, allyl alcohol, propargyl alcohol and methanol.

The polymer (c) employed in the present invention has both a hydroxyl group and an epoxy group. The polymer (c) preferably has an average of 2 to 10 epoxy groups, more preferably an average 3 to 8 epoxy groups, and an average of 2 to 12 hydroxyl groups, preferably an average of 4 to 10 hydroxyl groups. It is preferred that the polymer (c) has an epoxy equivalent of 100 to 800, desirably 200 to 700, and a hydroxyl equivalent of 200 to 1,200, desirably 400 to 1,000. Epoxy equivalents of more than 800 reduce curing ability and those of less than 100 make the cured resin composition hard and brittle. Hydroxyl equivalents of less than 200 deteriorate water resistance and those of more than 1,200 reduce curing ability.

The polymer (c) is prepared by copolymerizing (i) 5 to 40% by weight, preferably 15 to 30% by weight, of a hydroxyalkyl (meth)acrylate represented by:

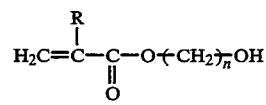

wherein R represents a hydrogen atom or a methyl group and n is an integer of 2 to 8, (ii) 10 to 60% by weight, preferably 15 to 50% by weight, of an epoxy group-containing ethylenically unsaturated monomer, and (iii) 0 to 85% by weight, preferably 10 to 60% by weight, of another copolymerizable ethylenically unsaturated monomer; the % by weight being based on total monomer weight.

The copolymerization may be conducted by art-known methods, for example radical solution polymerization. It is generally conducted at a temperature of 100° to 150° C. for 3 to 8 hours in the presence of a radical initiator (e.g. azo compounds and peroxides). The radical initiator can be used in an amount of 3 to 15% by weight based on the total monomer weight. In the copolymerization, an additive, such as chain transfer agent may added. The polymer (c) has a number average molecular weight of 500 to 20,000, preferably 1,500 to 10,000.

Typical examples of the monomers (i) are 2-hydroxyethyl (meth)acrylate, 4-hydroxybutyl (meth)acrylate, Placcel FM-1 (a ring-open adduct of ε-caprolactone and 2-hydroxyethyl methacrylate available from Daicel Chemical Industries, Ltd.) and the like. Typical examples of the monomers (ii) are glycidyl (meth)acrylate, 3,4-epoxycyclohexyl (meth)acrylate and the like. The monomer (iii) are the same as the other copolymerizable ethylenically unsaturated monomer as explained in the polymer having acid anhydride groups.

The thermosetting resin composition of the present invention is prepared by mixing the above mentioned three polymers (a), (b) and (c). The composition may be made in such an amount that a molar ratio of total acid group in the polymer (a) and the polymer (b)/epoxy group in the polymer (c) is within the range of 1/0.6 to 1/1.2, preferably 1/0.8 to 1/1.0. If the molar ratio is more than 1/0.6, the cured coating has poor crosslinkability. If it is less than 1/1.2, the cured coating easily becomes yellowish. The composition may also be made in such an amount that a molar ratio of total hydroxyl group in the polymers (a) and (c)/acid group in the polymer (b) is within the range of 1/2 to 2/1. If the amount is more than 1/2, the resulting coating has poor mar resistance. If it is less than 2/1, the resulting coating has poor water resistance due to the presence of excess hydroxyl groups.

The above mentioned molar ratios can be easily calculated by art known methods from hydroxyl equivalent, acid value and epoxy equivalent. It is preferred that the thermosetting resin composition of the present invention contains 0.5 to 40% by weight of the polymer (a), 10 to 60% by weight of the polymer (b) and 30 to 60% by weight of the polymer (c).

In the thermosetting resin composition of the present invention, the carboxyl groups and the carboxylic ester groups in the polymer (b) are ring-closed upon heating to form acid anhydride groups which are then reacted with the hydroxyl groups present in the polymers (a) and (c) to form crosslinked bonds and to reproduce acid groups. The reproduced acid groups in the polymer (b) and the acid groups present in the polymer (a) are reacted with the epoxy groups present in the polymer (c) to form crosslinked bonds. As a result, the three polymers (a), (b) and (c) are crosslinked together during curing. The low molecular weight compounds which have been reacted with the acid anhydride groups are removed by evaporation upon heating.

In the present composition, it is believed that, since both the hydroxyl groups in the polymer (c) and the carboxyl group in the polymer (a) are relatively apart from their polymer backbones and have a high degree of freedom of molecular motion adjacent to crosslinked bonds, the cured film has high elongation and exhibits excellent mar resistance.

The thermosetting resin composition of the present invention may further contain a curing catalyst for promoting the reaction between acid and epoxy. Typical examples of the curing catalysts are quaternary ammonium salts, such as benzyltriethylammonium chloride or bromide, tetrabutylammonium chloride or bromide, tetrabutylammonium salicylate or glycolate; sulfonates, such as p-toluenesulfonate; and the like. The curing catalyst may be present in the resin composition in an amount of 0.4 to 2.0% bt weight based on the solid content of the resin composition. The curing catalyst may be combined with tin catalysts which are art-known (see Japanese Kokai Publications 151651/1990 and 279713/1990). Examples of the tin catalysts are dimethyltin bis(methyl maleate), dimethyltin bis(ethyl maleate), dimethyltin bis(butyl maleate), dibutyltin bis(butyl maleate), SCAT-28 ® and SCAT-2L ® (available from Sankyo Yuki Gosei K.K.), and the like. The ratio of curing catalyst/tin catalyst may be within the range of 1/0.2 to 1/4.

The resin composition may also contain melamineformaldehyde resin, in order to enhance crosslinking density and water resistance. Further, a UV absorber commercially available from Ciba Geigy A.G. as Tinubin-900 ® and a hindered amine light stabilizer available from Sankyo Co., Ltd. as Sanol LS-292 may be added to enhance weather resistance. The composition may also contain other additives, such as rheology controlling agent (e.g. microgel), surface controlling agent. In order to adjust viscosity of the resin composition, a diluent (e.g. alcohols, such as methanol, ethanol, propanol and butanol; hydrocarbon; esters) may be added thereto.

The resin composition has carboxyl groups which are neutralized with amine to make the composition water-dispersible or water-soluble. The resin composition may be used in an aqueous resin composition.

The thermosetting resin composition of the present invention is suitably used for a clear coating composition. The clear coating composition is generally applied on a base coating layer formed from a base coating composition which is either aqueous or solvent-borne and contains color pigment. It is also preferred that the clear coating composition is applied on the base coating layer without curing the base coating layer and then the composite layer is baked to cure (two-coat one-bake curing system). In case where the aqueous base coating composition is employed in the two-coat one-bake system, the base coating layer, if necessary, is heated at 60° to 100° C. for 2 to 10 minutes before coating the clear coating composition. The base coating composition is generally explained in U.S. Pat. Nos. 5,151,125 and 5,183,504 which are herein incorporated. Especially, the aqueous coating composition disclosed in U.S. Pat. No. 5,183,504 is suitable in view of finish appearance and film performance.

The thermosetting resin composition may be prepared by art-known methods.

The resin composition may be applied on a substrate by spraying, brushing, dipping, roll coating, flow coating and the like. The substrate can be any one, including wood, metal, glass, fabric, plastics, plastic foam and the like. Preferred are plastics and metal (e.g. steel and aluminum). The substrate may be primered or intercoated by art-known methods if necessary.

The coating layer is generally cured by heating at a temperature of 100° to 180° C., preferably 120° to 160° C. Curing time may be varied by curing temperature, but generally for 10 to 30 minutes at a temperature of 120 to 160° C.

The film thickness of the resulting coating layer may be varied depending upon its usage, but in many cases within the range of 0.5 to 3 mil.

EXAMPLES

The present invention is illustrated by the following Examples which, however, are not to be construed as limiting the present invention to their details. The amounts herein used are "parts by weight", unless otherwise indicated.

Preparation Example A Preparation of the fluorinated polymer (a)

Fluorinated polymers F-i to F-v having the physical data as shown in Table 1 were ordered from companies which handle fluorinated copolymers (i.e. Daikin Industries, Ltd. and Asahi Glass Co., Ltd., both in Japan). A description of the preparation of such polymers is generally described in Japanese Kokai Publications 54469/1988, 9274/1989 and 158015/1989.

TABLE 1

| Polymer No. | F-i | F-ii | F-iii | F-iv | F-v |
|---|---|---|---|---|---|
| Fluorine monomer | Tetrafluoro-ethylene | Tetrafluoro-ethylene | Tetrafluoro-ethylene | Trifluoromono-chloroethylene | Trifluoromono-chloroethylene |
| Fluorine content (%) in the polymer | 32 | 27 | 30 | 18 | 20 |
| Number average molecular weight | 6,000 | 6,000 | 6,000 | 4,500 | 4,500 |
| Hydroxyl value (mg KOH/g) | 110 | 90 | 80 | 110 | 100 |
| Acid value (mg KOH/g) | 5 | 3 | 10 | 5 | 4 |
| Non-volatile content (%) | 50 | 50 | 50 | 50 | 50 |

The resulting fluorinated polymers were reacted with hexahydrophthalic anhydride (HHPA) in the amounts shown in Table 2 at 140° C. for 0.5 hour to obtain the fluorinated polymers having hydroxyl group and/or acid group A-I to A-V. The acid values and non-volatile contents of the resulting polymer are also shown in Table 2.

TABLE 2

| Polymer No. | A-I | A-II | A-III | A-IV | A-V |
|---|---|---|---|---|---|
| Starting polymer (Parts) | F-i (200) | F-ii (200) | F-iii (200) | F-iv (200) | F-v (200) |
| Amount of HHPA | 27.2 | 22.2 | 20.2 | 25.4 | 25.0 |
| Acid value (mg KOH/g) | 82 | 69 | 69 | 78 | 77 |
| Non-volatile content (%) | 56.0 | 55.0 | 54.5 | 55.5 | 55.5 |

Preparation Example B Preparation of the polymer b

A 2 liter reaction vessel, equipped with a thermometer, a stirrer, a condenser, a nitrogen-gas inlet and a dropping funnel, was charged with 250 parts by weight of xylene and 200 parts by weight of a solvent (available from Exxon Co., as Solvesso, and heated to 130° C. To the content, a monomer and initiator mixture containing 215 parts by weight of styrene, 225 parts by weight of n-butyl acrylate, 115 parts by weight of isobutyl methacrylate, 145 parts by weight of maleic anhydride, 235 parts by weight of propyleneglycol monomethyl ether acetate and 70% by weight of t-butylperoxy-2-ethyl hexanoate was charged over 3 hours. It was then held at 130° C. for 30 minutes and then a mixture of 15 parts by weight of xylene and 15 parts by weight of t-butyl-peroxy-2-ethyl hexanoate was added dropwise thereto over 30 minutes. Mixing was continued for one hour and then cooled to 70° C. To the content, 60 parts by weight of methanol was added and mixed at 70° C. for 24 hours to obtain a polymer B-I having both carboxyl group and carboxylic ester group. The polymer B-I was yellowish varnish which had a nonvolatile content of 50%, an acid value of 114 and a number average molecular weight of 3,000 (GPC).

Preparation Example C Preparation of the polymer (c)

A reaction vessel was charged with 800 parts by weight of butyl acetate and heated to 125° C. A monomer and initiator mixture of 50 parts by weight of styrene, 400 parts by weight of glycidyl methacrylate, 350 parts by weight of 4-hydroxybutyl acrylate, 200 parts by weight of 2-ethylhexyl acrylate and 100 parts by weight of t-butytperoxy-2-ethyl hexanoate was added thereto dropwise over 3 hours. After the completion of addition, it was kept at 125° C. for 30 minutes and then a mixture of 10 parts by weight of t-butylperoxy-2-ethyl hexanoate and 50 parts by weight of xylene was added dropwise over 30 minutes. The reaction was continued at 125° C. for one and half hours to obtain a colorless transparent varnish which contains a polymer C-I having a number average molecular weight of 3,500 and an epoxy equivalent of 696.

EXAMPLE 1

A resin composition was prepared by mixing the following ingredients:

| Ingredients | Parts by weight |
|---|---|
| Polymer A-I | 30.0 |
| Polymer B-I | 100.0 |
| Polymer C-I | 83.4 |
| Tetrabutylammonium salicylate | 0.67 |
| Tinubin-900 | 2.2 |
| Sanol LS-292 | 1.1 |

The resulting composition was diluted with a solvent mixture of Solvesso 100/xylene (1/1) to a coatable viscosity to obtain a clear coating composition.

A phosphated steel panel was intercoated with Power Top U-30 (electrodeposition paint available from Nippon Paint Co., Ltd.) and Orga P-2 (intercoating paint available from Nippon Paint Co., Ltd.). It was then base-coated with a metallic base paint (Super Lack M-90 available from Nippon Paint Co., Ltd.) and then coated with the above obtained clear coating composition with wet-on-wet. It was baked at 140° C. for 30 minutes. The resulting cured film was evaluated as follows and the results are shown in Table 4.

Evaluations
(1) Pencil hardness: This is evaluated according to JIS K 5400-1979.
(2) Warm water resistance: The cured coating was dipped in warm water at 40° C. for 10 days and then its appearance was visually evaluated.
(3) Alkali resistance: The cured coating was contacted with 0.2 ml of a 0.1 N NaOH aqueous solution at 55° C. for 4 hours, and then visually evaluated.
(4) Acid resistance: The cured coating was contacted with 0.2 ml of a 0.1 N $H_2SO_4$ aqueous solution at 55° to 60° C. for 2 hours and then visually evaluated.
No change is observed.—Excellent
Slightly changed—Good
Definitely changed—Poor
(5) Mar resistance: One gram of a 50% cleanser water solution (available from Kao Corp. as New Homing Cleanser containing 87% by weight of abrasive particles, 5% by weight of surfactant and the others) was coated on a flannel fabric (2×2 cm) and attached to a fastness tester of the fraction of colored fabric (available from Daiei Kagaku Seiki K.K.). The cured coating was rubbed with the fabric back and forth 10 times at a load of 500 g, and then 20° gloss was measured by a gloss meter (available from Suga Shikenki K.K.) before and after rubbing, and its change was expressed by percentage. The percentage is generally related to visual evaluation as follow.
>90—No change
80 to 90—Slight change but insignificant
70 to 80—Change is recognized.
70>—Definitely change
(6) Water repellency: On the cured coating, 0.4 ml of ion-exchanged water was dropped and its contact angle was measured by a Face Contact Angle Meter CAZ available from Kyowa Kaimen Kagaku K.K.

EXAMPLES 2–5

Clear coating compositions were prepared as generally described in Example 1, with the exception that the ingredients shown in Table 3 were employed, and the same evaluations as Example 1 were conducted. The results are shown in Table 4.

TABLE 3

| Example No. | Polymer (a) (Parts by weight) | Polymer (b) (Parts by weight) | Polymer (c) (Parts by weight) | Curing catalyst (Parts by weight) | Additives (Parts by weight) |
| --- | --- | --- | --- | --- | --- |
| 2 | A-II (9.1) | B-I (100) | C-I (75.0) | TBABr*[1] (0.7) | Tinubin 900 (2.1), Sanol LS-292 (1.0) |
| 3 | A-III (36.7) | B-I (100) | C-I (86.1) | TBASA*[2]/TBAPTS *[3] (0.8/0.2) | Tinubin 900 (2.3), Sanol LS-292 (1.1) |
| 4 | A-IV (45.0) | B-I (100) | C-I (92.0) | TBASA (0.9) | Tinubin 900 (2.5), Sanol LS-292 (1.3) |
| 5 | A-V (27.0) | B-I (100) | C-I (76.5) | TBASA/SCAT-28*[4] (0.7/1.0) | Tinubin 900 (2.2), Sanol LS-292 (1.1) |

*[1] Tetrabutylammonium bromide
*[2] Tetrabutylammonium salicylate
*[3] Tetrabutylammonium p-toluenesulfonate
*[4] Tin compound available from Sankyo Yuki Gosei K.K.

EXAMPLES 6–8

As base coating, three compositions were prepared as generally described in Examples 1–3, at column 9, line 16 to column 10, line 6 of U.S. Pat. No. 5,183,504.

A phosphated steel panel was intercoated as described in Example 1, and spray-coated with each of the above mentioned three base coating compositions. After pre-heating at 60° C. for 5 minutes, it was coated with the clear coating composition obtained in Example 1 and then cured at 140° C. for 30 minutes. The same evaluations as Example 1 were conducted and the results are shown in Table 4.

TABLE 4

| Example No. | Pencil hardness | Warm water resistance | Alkali resistance | Acid resistance | Scuff resistance | Water repellency (°) | Water repellency after weathering (°) |
| --- | --- | --- | --- | --- | --- | --- | --- |
| 1 | F | No change | No change | Excellent | 90 | 93 | 89 |
| 2 | F | No change | No change | Excellent | 82 | 91 | 85 |
| 3 | H | No change | No change | Excellent-good | 91 | 95 | 91 |
| 4 | F | No change | No change | Excellent-good | 91 | 97 | 93 |
| 5 | F | No change | No change | Excellent | 88 | 92 | 88 |
| 6 | F | No change | No change | Excellent | 90 | 93 | 87 |
| 7 | F | No change | No change | Excellent | 88 | 90 | 88 |
| 8 | F | No change | No change | Excellent | 91 | 91 | 87 |

As is shown in Table 4, the clear coating composition of the present invention has excellent acid resistance, mar resistance and water repellency.

What is claimed is:
1. In a process of forming a coating on a substrate, comprising applying a colored base of a water-borne or solvent-borne coating on a primered or intercoated substrate, and then applying a clear top coat without curing the base layer, and then baking both the base and clear coating layers to cure; the improvement comprising applying as the clear top coat a thermosetting resin composition comprising the following components:

(a) from about 0.5 to 40% by weight of a fluorinated polymer having a hydroxyl group and/or an acid group, represented by:

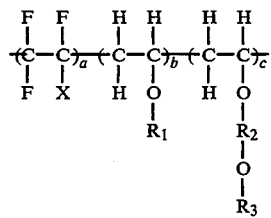

wherein said $R_1$ represents a linear or branched alkyl group or an alkyloyl group, having 2 to 10 carbon atoms, $R_2$ represents an alkylene group having 2 to 10 carbon atoms, $R_3$ represents a hydrogen atom or $-CO-R_6-COOH$ in which $R_6$ represents a residue of a dibasic acid anhydride, X is a hydrogen atom, a chlorine atom or a fluorine atom, a, b and c are integers satisfying $a \leq b+c$, (b) from about 10 to 60% by weight of a polymer having a carboxyl group and a carboxylic ester, prepared by copolymerizing from about 15 to 40% by weight of an ethylenically unsaturated monomer having an acid anhydride group, and from about 60 to 85% by weight of another ethylenically unsaturated copolymerizable monomer to obtain a polymer having acid anhydride groups which are then reacted with a hydroxyl compound having 1 to 12 carbon atoms in a molar ratio of acid anhydride group to hydroxyl group of from about 1/1 to 1/1.5% by weight of monomers being based on total monomer weight, and (c) from about 30 to 60% by weight of a polymer having a hydroxyl group and an epoxy group, prepared by copolymerizing:

(i) from about 5 to 40% by weight of a hydroxyalkyl (meth)acrylate represented by:

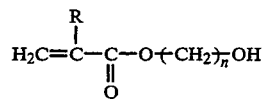

wherein R represents a hydrogen atom or a methyl group and n is an integer of 2 to 8, (ii) from about 10 to 60% by weight of an epoxy group-containing ethylenically unsaturated monomer, and (iii) from about 0 to 85% by weight of another copolymerizable ethylenically unsaturated monomer; the % by weight being based on total monomer weight.

2. The process according to claim 1, further comprising heating the base coat before application of the top coat to a temperature of from about 60° to 100° C. for from about 2 to 10 minutes.

3. The process according to claim 1 wherein curing occurs from the combination of the following reactions:

(i) the carboxyl groups and carboxylic ester groups in the component (b) polymer are reacted by heating to form acid anhydride groups and free hydroxyl group-containing low molecular weight compounds which are then removed away of the system by evaporation, (ii) the resulting acid anhydride groups in the component (b) polymer are reacted with the hydroxyl groups in polymers (a) and (c) to form crosslinking and simultaneously to reproduce carboxyl groups, and (iii) the reproduced carboxyl groups and the other carboxyl groups in polymers (a) are reacted with the epoxy groups in polymers (c) to form crosslink.

* * * * *